DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 9

T917,008

HOT MELT ADHESIVE CONTAINING HYDROGENATED AROMATIC HYDROCARBON RESIN TACKIFIER

Robert G. Fajans, Newark, Del., assignor to Hercules Incorporated, Wilmington, Del.

Filed Mar. 9, 1973, Ser. No. 339,693
Int. Cl. C08f *29/12*
U.S. Cl. 260—28.5 A
No Drawing. 8 Pages Specification

Hot melt adhesive compositions comprise a thermoplastic component and a tackifier comprising hydrogenated aromatic hydrocarbon petroleum resins. The thermoplastic component can be low molecular weight polyethylene, amorphous polypropylene, paraffin wax, styrene-butadiene copolymers, styrene-isoprene-styrene block copolymers, polyvinyl acetate, and is preferably an ethylene-vinyl acetate copolymer.

The hydrogenated aromatic hydrocarbon petroleum resins used as the tackifier are derived from polymerized cracked naphtha fractions boiling in the range of from about −10° C. to about 280° C. and containing polymerizable unsaturated hydrocarbons of which at least 50% by weight consists of a mixture of aromatic olefins, cyclic olefins and cyclic diolefins.

Hot melt adhesives are used to bond wood, paper, plastics, textiles, etc.